(12) United States Patent
Wigren

(10) Patent No.: US 8,346,177 B2
(45) Date of Patent: Jan. 1, 2013

(54) METHODS AND ARRANGEMENTS FOR MEMORY-EFFICIENT ESTIMATION OF NOISE FLOOR

(75) Inventor: Torbjörn Wigren, Uppsala (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 904 days.

(21) Appl. No.: 12/442,901

(22) PCT Filed: Sep. 25, 2006

(86) PCT No.: PCT/SE2006/050347
§ 371 (c)(1),
(2), (4) Date: Mar. 25, 2009

(87) PCT Pub. No.: WO2008/039123
PCT Pub. Date: Mar. 4, 2008

(65) Prior Publication Data
US 2010/0035558 A1 Feb. 11, 2010

(51) Int. Cl.
*H04B 17/00* (2006.01)
(52) U.S. Cl. .......... 455/67.13; 455/63.1; 455/450; 455/452.1; 455/453; 455/509
(58) Field of Classification Search .......... 455/67.11, 455/67.13, 450–543, 63.1, 509–510
See application file for complete search history.

(56) References Cited

U.S. PATENT DOCUMENTS
2001/0055952 A1  12/2001  Ficarra

OTHER PUBLICATIONS

Hiroyuki Yashima et al Performance of chip coding in FFH SSMA systems Selected Areas in Communications. IEEE Journal on. vol. 14, Iss.9, Dec. 1996 pp. 1841-1851 see p. 1845, col. 2, line 1-line 6.
Hong Wang et al Neural network based probability density function shape control for unknown stochastic systems Intelligent Control, 2004. Proceedings of the 2004 IEEE International Symposium on, vol., Iss., Sep. 2-4, 2004 pp. 120-125 see p. 122, col. I, line 40-col. 2, line 4; equation 13.
Martinez-Cantin, R et al Unscented SLAM for large-scale outdoor environments Intelligent Robots and Systems, 2005. (IROS 2005). 2005 IEEE/RSJ International Conference on, vol., Iss., Aug. 2-6, 2005 pp. 3427-3432 See I-lines 14-19.

*Primary Examiner* — Raymond Dean

(57) ABSTRACT

A method for noise rise estimation in a wireless communications system is presented, which comprises measuring of samples of at least received total wideband power. From the measured samples of at least received total wideband power, a probability distribution for a first power quantity is estimated. This first power quantity can be the received total wideband power itself. The probability distribution for the first power quantity is used for computing a conditional probability distribution of a noise floor measure. This computing is performed recursively. A value of a noise rise measure is finally calculated based on the conditional probability distribution for the noise floor measure. A node of a wireless communications system having the above functionality is also presented. Typically, the node is a RNC.

20 Claims, 6 Drawing Sheets

METHODS AND ARRANGEMENTS FOR MEMORY-EFFICIENT ESTIMATION OF NOISE FLOOR

TECHNICAL FIELD

The present invention relates in general to methods and devices for estimation of power-related quantities in cellular communications systems, and in particular for estimation of noise floor.

BACKGROUND

Wideband Code Division Multiple Access (WCDMA) telecommunication systems have many attractive properties that can be used for future development of telecommunication services. A specific technical challenge in e.g. WCDMA and similar systems is the scheduling of enhanced uplink channels to time intervals where the interference conditions are favourable, and where there exist a sufficient capacity in the uplink of the cell in question to support enhanced uplink channels. It is well known that existing users of the cell all contribute to the interference level in the uplink of WCDMA systems. Further, terminals in neighbour cells also contribute to the same interference level. This is because all users and common channels of a cell transmit in the same frequency band when CDMA technology is used. The load of the cell is directly related to the interference level of the same cell. The admission control function of the RNC in WCDMA is thus central, since overload results in poor quality of service and unstable cells, behaviors needed to be avoided.

The present invention relates to the field of load estimation in code division multiple access cellular telephone systems. Several radio resource management (RRM) algorithms such as scheduling and admission control rely on accurate estimates of the uplink load.

The admission control algorithms need to balance the available resources of each cell or RBS, against the requested traffic by users. This means that important inputs to the admission control algorithms include available HW resources, as well as information on the momentary number of users and their ongoing traffic, in each cell.

In order to retain stability of a cell and to increase the capacity, fast enhanced uplink scheduling algorithms operate to maintain the load below a certain level. This follows since the majority of uplink user channels, at least in WCDMA, are subject to power control. This power control aims at keeping the received power level of each channel at a certain signal to interference ratio (SIR), in order to be able to meet specific service requirements. This SIR level is normally such that the received powers in the radio base station (RBS) are several dBs below the interference level. De-spreading in so called RAKE-receivers then enhance each channel to a signal level where the transmitted bits can be further processed, e.g. by channel decoders and speech codecs that are located later in the signal processing chain.

Since the RBS tries to keep each channel at its specific preferred SIR value, it may happen that an additional user, or bursty data traffic of an existing user, raises the interference level, thereby momentarily reducing the SIR for the other users. The response of the RBS is to command a power increase to all other users, something that increases the interference even more. Normally this process remains stable below a certain load level. In case a high capacity channel would suddenly appear, the raise in the interference becomes large and the risk for instability, a so called power rush, increases. It is thus a necessity to schedule high capacity uplink channels, like the enhanced uplink (E-UL) channel in WCDMA, so that one can insure that instability is avoided. In order to do so, the momentary load must be estimated in the RBS. This enables the assessment of the capacity margin that is left to the instability point.

A particularly useful measure is the uplink (and downlink) cell load(s), measured in terms of the rise over thermal (or noise rise). Rise over thermal (ROT) is defined as the quotient between the momentary wide band power and a thermal noise floor level. All noise rise measures have in common that they rely on accurate estimates of the background noise. Determinations of highly fluctuating power quantities or noise floor according to prior art is typically associated with relatively large uncertainties, which even may be in the same order of magnitude as the entire available capacity margin. It will thus be very difficult indeed to implement enhanced uplink channel functionality without improving the load estimation connected thereto.

At this point it could be mentioned that an equally important parameter that requires load estimation for its control, is the coverage of the cell. The coverage is normally related to a specific service that needs to operate at a specific SIR to function normally. The uplink cell boundary is then defined by a terminal that operates at maximum output power. The maximum received channel power in the RBS is defined by the maximum power of the terminal and the pathloss to the digital receiver. Since the pathloss is a direct function of the distance between the terminal and the RBS, a maximum distance from the RBS results. This distance, taken in all directions from the RBS, defines the coverage.

It now follows that any increase of the interference level results in a reduced SIR that cannot be compensated for by an increased terminal power. As a consequence, the pathloss needs to be reduced to maintain the service. This means that the terminal needs to move closer to the RBS, i.e. the coverage of the cell is reduced.

From the above discussion it is clear that in order to maintain the cell coverage that the operator has planned for, it is necessary to keep the load below a specific level. This means that load estimation is important also for coverage. In particular load estimation is important from a coverage point of view in the fast scheduling of enhanced uplink traffic in the RBS.

Furthermore, the admission control and congestion control functionality in the radio network controller (RNC) that controls a number of RBSs also benefits from accurate information on the momentary noise rise of each cell it controls. The bandwidth by which the RNC functionality affect the cell performance is significantly slower than what was described above, for enhanced uplink scheduling, however, the impacts on cell stability that was discussed above for enhanced uplink are also valid to some extent for the admission control functionality of the RNC.

Admission control assures that the number of users in a cell do not become larger than what can be handled, in terms of hardware resources and in terms of load. A too high load first manifests itself in too poor quality of service, a fact that is handled by the outer power control loop by an increase of the SIR target. In principle this feedback loop may also introduce power rushes, as described above.

The admission control function can prevent both the above effects by regulation of the number of users and corresponding types of traffic that is allowed for each cell controlled by the RNC. A particularly important input to achieve this goal is an accurate estimate of the noise rise of the cell.

Even though noise rise estimated in the RBS may be signaled to the RNC, all vendors may not support this signaling, or may not provide accurate enough load estimation. Hence there is a need for estimation of noise rise in the RNC.

An additional problem appears when scheduling of enhanced uplink traffic is implemented in RNCs. Since the RNC may control about 1000 cells today and probably far more in the future, also quite moderate requirements concerning memory consumption and processing power algorithms for noise rise estimation multiplies with the number of served cells. In particular memory wasting solutions are difficult to implement in RNCs. A final very important advantage is that the algorithm disclosed in the present invention disclosure lends itself to ASIC implementation.

SUMMARY

A general problem with prior art CDMA communications networks is that load estimations are presented with an accuracy which makes careful load control difficult. In particular, determination of noise rise in connection with enhanced uplink channels, suffers from large uncertainties, primarily caused by difficulties to estimate the noise floor or other power-related quantities. Furthermore, high memory requirements during noise floor estimations may be an additional obstacle.

A general object of the present invention is to provide improved methods and arrangements for determining power-related quantities, e.g. load estimation. A further object of the present invention is to provide methods and arrangements giving more accurate determination of power-related quantities. Yet a further object of the present invention is to provide methods and arrangements for improving noise rise estimations. Another object of the present invention is to provide methods and arrangements for determining power-related quantities having low requirements on memory.

The above objects are achieved with methods and devices according to the enclosed patent claims. In general words, in a first aspect, a method for noise rise estimation in a wireless communications system is presented, comprising measuring of samples of at least received total wideband power. From the measured samples of at least received total wideband power, a probability distribution for a first power quantity is estimated. Typically, this first power quantity is the received total wideband power itself. The probability distribution for the first power quantity is used for computing a conditional probability distribution of a noise floor measure. This computing is performed recursively. A value of a noise rise measure is finally calculated based on the conditional probability distribution for the noise floor measure.

In a second aspect a node of a wireless communications system is presented. Typically, the node is a RNC. The node comprises means for obtaining measured samples of at least received total wideband power and means for estimating a probability distribution for a first power quantity from at least the measured samples of at least received total wideband power. The node further comprises means, operating in a recursive manner, for computing a conditional probability distribution of a noise floor measure based on at least said probability distribution for a first power quantity. The node also comprises means for calculating a value of the noise rise measure based on the conditional probability distribution for the noise floor measure.

One advantage of the present invention is that an accurate noise rise value can be provided, even in the presence of neighbour cell interference, external interference sources and rapidly fluctuating powers. Furthermore, the present invention has a comparatively low computational complexity and memory requirements. Further advantages are discussed in connection with the detailed description.

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the entire disclosure, bold letters in equations refer to vector or matrix quantities.

In the present disclosure, complements to different distribution functions are discussed. The definition follows. A complement to a cumulative distribution function F is defined as one minus the cumulative distribution function F. In the case of e.g. a cumulative error distribution function $$F_{\Delta x(t'|t')}(x - \hat{x}_{pTotal}^{Kalman}(t'|t'))$$

(defined further below), the complement of the cumulative error distribution function becomes $$1 - F_{\Delta x(t'|t')}(x - \hat{x}_{pTotal}^{Kalman}(t'|t')).$$

The present detailed description is introduced by a somewhat deeper discussion about how to perform load estimation and the problems encountered by prior art solutions, in order to reveal the seriousness thereof. This is done with reference to a typical WCDMA system, but the ideas are not restricted to WCDMA. They are rather applicable in many types of cellular systems, in particular all sorts of CDMA systems.

Reference and Measurement Points

Figure 1:
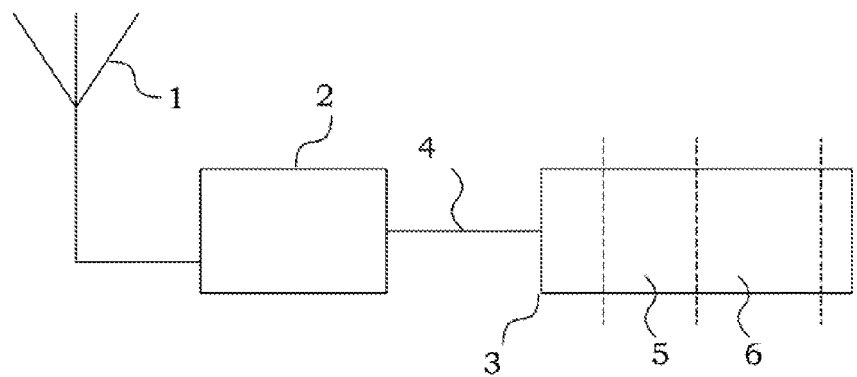
FIG. 1 shows a signal chain of a radio base station performing load estimation.

A typical signal chain of a RBS is depicted in FIG. 1. A received wideband signal from an antenna 1 first passes an analogue signal conditioning chain 2, which consists of cables, filters etc. Variations among components together with temperature drift, render the scale factor of this part of the system to be undetermined with about 2-3 dBs, when the signal enters a receiver 3. This is discussed further below. In the receiver 3, a number of operations take place. For load estimation it is normally assumed that a total received wideband power is measured at some stage, in FIG. 1 denoted by 5. Furthermore, it is assumed in this embodiment that code power measurements, i.e. powers of each individual channel/user of the cell, are made available at a stage 6. A reference point for estimated quantities is referred to as 4. The points in the chain where estimated quantities are valid, and where measurements are taken, are schematically shown in FIG. 1.

There are several reasons for the difficulties to estimate the thermal noise floor power. One reason as indicated above is that the thermal noise floor power, as well as the other received powers, is affected by component uncertainties in the analogue receiver front end. The signal reference points are, by definition, at the antenna connector. The measurements are however obtained after the analogue signal conditioning chain, in the digital receiver. These uncertainties also possess a thermal drift.

The analogue signal conditioning electronics chain does introduce a scale factor error of 2-3 dB between RBSs (batch) that is difficult to compensate for. The RTWP (Received Total Wideband Power) measurement that is divided by the default value of the thermal noise power floor may therefore be inconsistent with the assumed thermal noise power floor by 2-3 dB. The effect would be a noise rise estimate that is also wrong by 2-3 dB. Considering the fact that the allowed noise rise interval in a WCDMA system is typically 0-7 dB, an error of 2-3 dB is not acceptable.

Fortunately, all powers forming the total received power are equally affected by the scale factor error $\gamma(t)$ so when the noise rise ratio $N_R(t)$ is calculated, the scale factor error is cancelled as $$N_R(t) = N_R^{DigitalReceiver}(t) = \frac{P^{Total,DigitalReceiver}(t)}{P_N^{DigitalReceiver}} = \frac{\gamma(t)P^{Total,Antenna}(t)}{\gamma(t)P_N^{Antenna}} = \frac{P^{Total,Antenna}(t)}{P_N^{Antenna}} = N_R^{Antenna}(t) \quad (1)$$

where $N_R^{DigitalReceiver}(t)$ and $N_R^{Antenna}(t)$ are the noise rise ratios as measured at the digital receiver 3 (FIG. 1) and at the antenna 1 (FIG. 1), respectively, $P^{Total,DigitalReceiver}(t)$ and $P^{Total,Antenna}(t)$ are the total received powers at the digital receiver 3 and the antenna 1, respectively, and $P_N^{DigitalReceiver}$ and $P_N^{Antenna}$ are the thermal noise level as measured at the digital receiver 3 and the antenna 1, respectively. However, note that (1) requires measurement of the noise floor $P_N^{DigitalReceiver}$ in the digital receiver. This is one difficulty that is addressed by the present invention.

Power Measurements

In the detailed description the following general notations are used:

Measurements of the total received wideband power are performed in the receiver. This measurement is denoted by $P^{Total}(t)$, where t denotes discrete time. The measurement rate is $T^{-1}$ HZ.

Noise Rise

Figure 2:
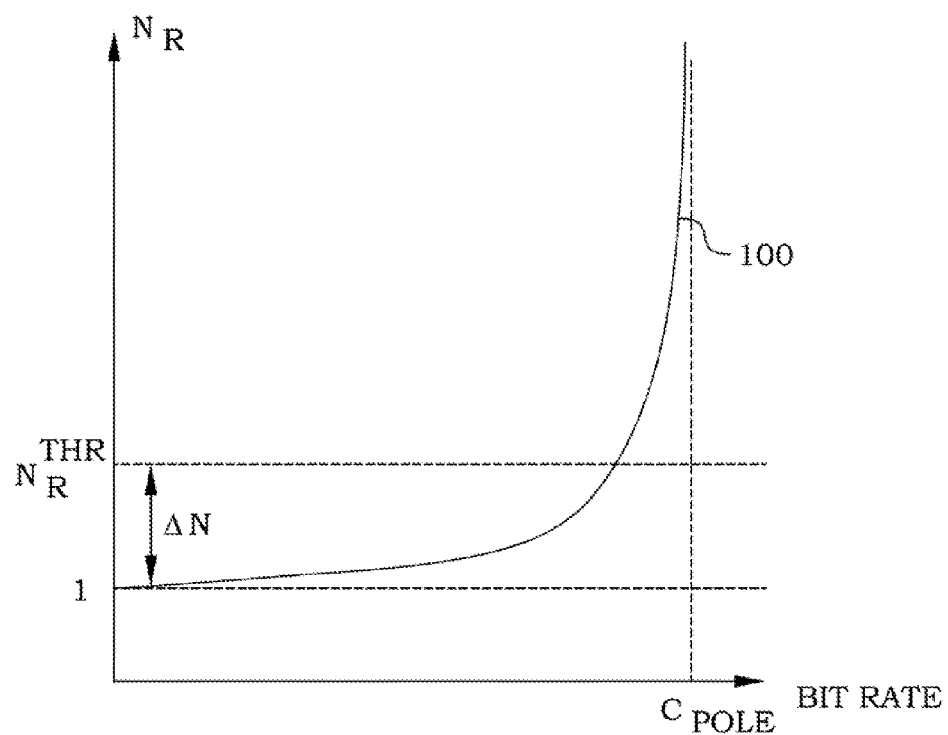
FIG. 2 illustrates a typical relation between noise rise and total bitrate in a cell.

As indicated in the background section, the result of introducing additional channels becomes an increase of the total power. FIG. 2 is a diagram illustrating these conditions. Noise rise $N_R$, defined as the ratio between a total power and the thermal noise level $P_N$ as measured at the antenna connector, also referred to as the noise floor, is a measure of the load. Above a noise rise threshold $N_R^{thr}$, the situation becomes unstable. A relation 100 between total bit rate and noise rise $N_R$ is known from the design of the control loops, and scheduling of additional channels can be performed once the instantaneous noise rise $N_R$ has been determined. The pole capacity, $C_{pole}$, denotes the maximum bitrate capacity in bits per second. A typical difference $\Delta N$ between the threshold $N_R^{thr}$ and the level defined by the thermal noise level $P_N$ is 7 dB. However, the noise floor or thermal noise level $P_N$ is not readily available. For instance, since scale factor uncertainties in the receiver may be as large as 2-3 dB as discussed above, a large part of the available margin is affected by such introduced uncertainties.

Observability of Noise Floor

One reason for the difficulties to estimate the thermal noise floor power now appears, since even if all measurements are made in the digital receiver, the noise floor cannot be directly measured, at least not in a single RBS. The explanation is that neighbour cell interference and interference from external sources also affect the receiver, and any mean value of such sources cannot be separated from the noise floor. Power measurements on the own cell channels may in some cases be performed, increasing the complexity of the system. Such measurements do however not solve the entire problem, although they may improve the situation somewhat.

Figure 3:
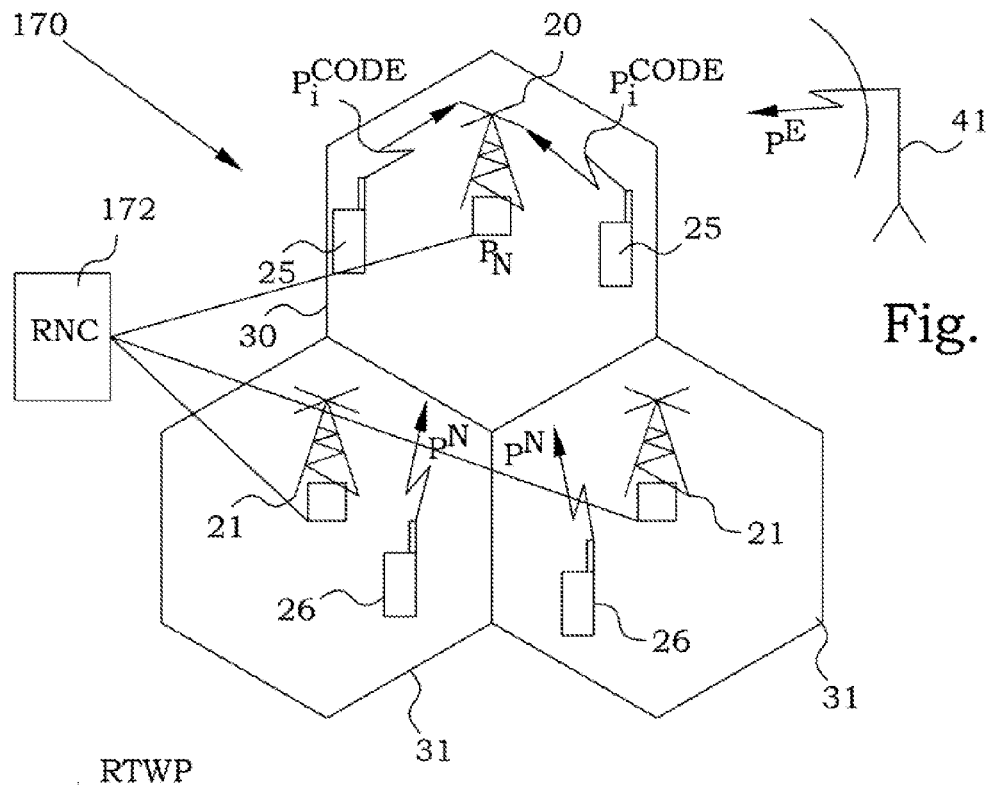
FIG. 3 is a schematic illustration of signal powers occurring in a typical mobile communications network.

FIG. 3 illustrates the contributions to power measurements in connection with an RBS 20. The RBS 20 is associated with a cell 30. Within the cell 30, a number of mobile terminals 25 are present, which communicates with the RBS 20 over different links, each contributing to the total received power by $P_i^{Code}(t)$. The cell 30 has a number of neighbouring cells 31 within the same WCDMA system, each associated with a RBS 21. The neighbouring cells also comprise mobile terminals 26. The mobile terminals 26 emit radio frequency power and the sum of all such contributions is denoted by $P^N$. There may also be other network external sources of radiation, such as e.g. a radar station 41. Contributions from such external sources are denoted by $P^E$. Finally, the $P_N$ term arises from the receiver itself. The RBS's 20, 21 are typically connected to a RNC 172.

It is clear from the above that $P^N(t)$ and $P_N$ are not measurable and hence need to be estimated or eliminated in some way. The situation becomes even worse if only measurements of total wide band power are available. Total wide band power measurement $P_{Measurement}^{Total}(t)$ can be expressed by:

$$P_{Measurement}^{Total}(t) = \sum_{i=1}^{n} P_i^{Code}(t) + P^{E+N}(t) + P_N(t) + e^{Total}(t), \quad (2)$$

where $$P^{E+N} = P^E + P^N, \quad (3)$$

and where $e^{Total}(t)$ models measurement noise.

It can be mathematically proved that a linear estimation of $P^{E+N}(t)$ and $P_N$ is not an observable problem. Only the sum $P^{E+N}+P_N$ is observable from the available measurements. This is true also in case code power measurements are performed. The problem is that there is no conventional technique that can be used to separate the noise floor from power mean values originating from neighbour cell interference and in-band interference sources external to the cellular system. Furthermore, if only measurements of total received wide band power is available, also the individual code power contributions are indistinguishable from the other contribution.

Noise Floor Estimations

Yet another reason for the difficulty with noise rise estimation is that the thermal noise floor is not always the sought quantity. There are situations where constant in-band interference significantly affects the receiver of the RBS. These constant interferers do not affect the stability discussed above, they rather appear as an increased noise temperature, i.e. an increased thermal noise floor.

In prior art, one alternative is to use costly and individual determination of the thermal noise floor of each RBS in the field, in order to achieve a high enough load estimation performance. The establishment of the default value for the thermal noise power floor, as seen in the digital receiver requires reference measurements performed over a large number of RBSs either in the factory or in the field. Both alternatives are costly and need to be repeated as soon as the hardware changes.

The above approach to solve the problem would require calibration of each RBS individually. This would however be very costly and is extremely unattractive. Furthermore, temperature drift errors in the analogue signal conditioning electronics of perhaps 0.7-1.0 dB would still remain.

Another approach is to provide an estimation of the thermal noise power floor. One principle for estimation of the thermal noise power floor is to estimate it as a minimum of a measured or estimated power quantity comprising the thermal noise floor. If no code power measurements are available, the power quantity in question is typically the total received wideband power. One approach would therefore be to calculate the noise rise as a division of the momentary total received wideband power with an established thermal noise floor power estimated as a minimum of the total received wideband power.

Figure 4:
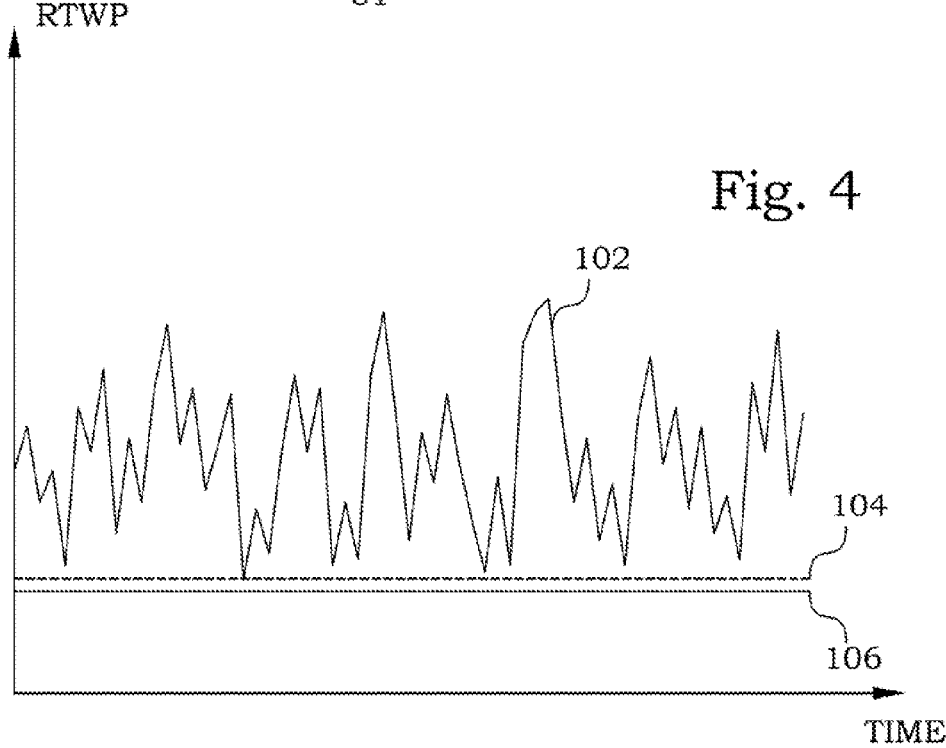
FIG. 4 is a time diagram of received total wideband power.

This is schematically illustrated in FIG. 4. Momentary values 102 of a received total wideband power are here illustrated as a function of time. The values fluctuate considerably depending on the momentary load. It is known that the thermal noise floor contribution always is present, and consequently it can be concluded that if measurement uncertainties are neglected, the noise floor contribution has to be equal to or smaller than the minimum value 104 of the total received wideband power received within a certain period of time. If there is a reasonable probability that all code power contributions, neighbour cell contributions and other external contributions at some occasion are equal to zero, the minimum value 104 is a good estimation of the "true" noise floor 106. However, in all situations, it is certain that the minimum value 104 constitutes an upper limit of the unknown noise floor.

In order to improve the estimation of the noise floor, a recursive estimation filter can be applied to the series of measurements, providing estimates of the received total wideband power, as well as the variance thereof. The thermal noise power floor may then be estimated by soft algorithms.

The principle of using a division with an established thermal noise floor power has a number of properties, some of which may be disadvantages, at least in certain applications. The estimation principle establishes a specific value of the thermal noise power floor, as the output variable. This is neither optimal nor necessary. The output quantity that is really needed is the noise rise, and as will be mentioned below, this quantity can be estimated directly. Furthermore, the estimation principle does not provide any measure of the accuracy of the estimated thermal noise power floor, nor the noise rise. This is a consequence of the fact that only one value of the thermal noise power floor is estimated.

Moreover, the estimation principle above does not account for prior information that is available on e.g. the probability distribution of the true thermal noise floor power, over a collection of RBSs. This has further consequences. The estimate of the thermal noise power floor obtained by the above ideas is always biased to be higher than the true value. This follows since the sum of thermal noise floor power, neighbour cell WCDMA power and non-WCDMA in-band interference power is always at least as great as the thermal noise power floor. Hence, when the minimum is estimated over a determined interval of time, a value larger than the true thermal noise power is always obtained. A consequence of this is that the noise rise is underestimated, i.e. the load of the cell is underestimated. The consequence could be too aggressive scheduling, leading e.g. to cell instability.

Mentioned above, the present invention allows a direct estimation of the conditional probability distribution of the noise rise. This is obtained as follows. The recursive algorithm proposed in the present invention estimates the conditional probability distribution of the noise floor. Furthermore the probability distribution of the received total wideband power is available from processing described further below. From these two probability distributions, the conditional probability distribution of the noise rise is easily computed by considering formulas for the distribution of the quotient of two random variables.

Thereby an additional important benefit in the present invention is an estimate of the one dimensional probability density function of the noise rise, not just a single value, or at least a probability density function of the noise floor is determined. An important benefit of the fact that the complete probability distribution is estimated is the possibility to compute the variance (standard deviation) of the estimate. Thereby the quality of the estimation process will automatically be assessed. Uncertainty measures like this one are likely to be highly useful when e.g. enhanced uplink channels are scheduled in later steps.

A value of the noise floor can indeed be estimated from the conditional probability distribution of the noise floor also in the present invention. This estimated noise floor value can then be utilised for calculation of a noise rise measure by simply divide an estimate of a presently received total wideband power with the estimated noise floor value in a conventional manner. However, such embodiment does not have the advantages described above.

Figure 5:
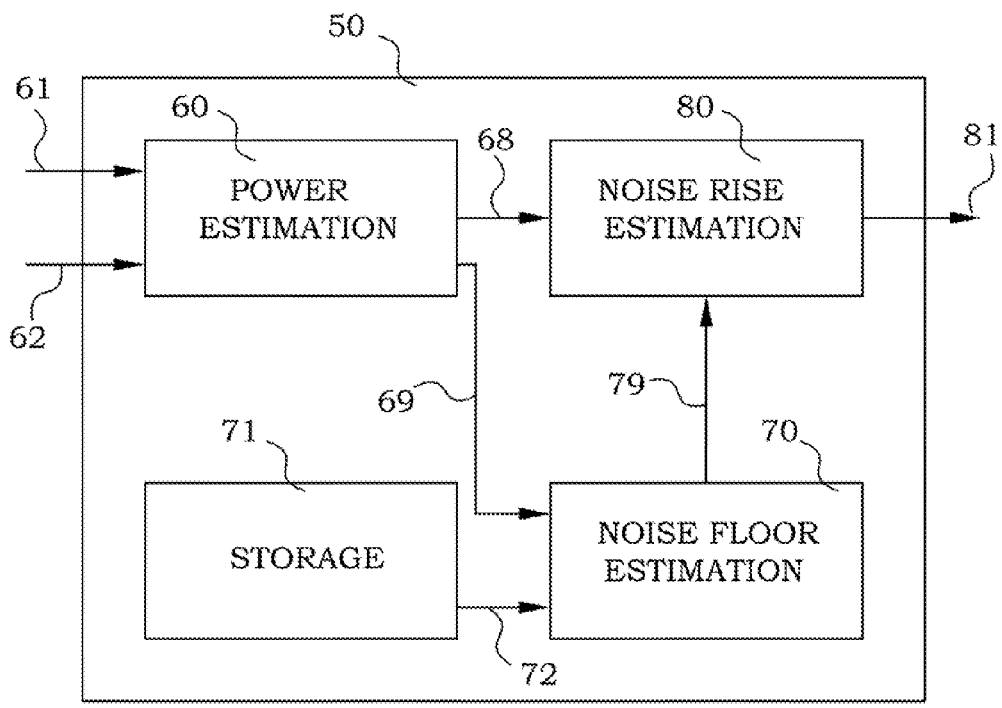
FIG. 5 is a block scheme of an embodiment of a noise rise estimation arrangement according to the present invention.

An embodiment of estimating noise rise is schematically illustrated as a block diagram in FIG. 5. This embodiment relates to the field of load estimation in code division multiple access cellular telephone systems. The disclosure of the preferred embodiment is written for load estimation functionality with respect to the enhanced uplink (E-UL) in WCDMA type cellular systems. Note however, that the situation for other cellular systems of CDMA type should be similar so most of the detailed discussion should be valid for these systems as well.

Note that in the following description, probability distributions are handled by digital systems, typically by discretising the distributions as histograms.

A noise rise estimation arrangement 50 comprises three main blocks 60, 70, 80. In a first, power estimation block 60, a Kalman filter arrangement receives inputs 61, in the present embodiment the measured received total wideband power RTWP. Mathematical details of preferred embodiment are disclosed in Appendix A. The output 69 from the power estimation block 60 is the estimate of a power quantity and the corresponding variance, in the present embodiment the estimate of the received total wideband power RTWP and the corresponding variance. Since the outputs are from the Kalman filter arrangement, these parameter are the only ones needed to define the estimated Gaussian distribution that is produced by the filter. Thus, enough information is given to define the entire probability distribution information of the RTWP estimate. The filter details are discussed more in detail further below.

In more advanced systems, the power estimation block 60 may base its estimated on further power parameters 62, e.g. measured code power to interference ratio (C/I) of different channels i, beta factors for the channels i, number of codes for the channels i, and corresponding code power to interference ratio commanded by the fast power control loop. In such cases, the output 69 from the power estimation block 60 may be an estimate of another power related quantity and corresponding variance. The estimate of a power quantity could e.g. be the sum of neighbour cell WCDMA interference power, in-band non-WCDMA interference power and thermal noise floor power.

In a second, conditional probability distribution estimation block 70, an arrangement based on Bayesian statistics receives the power quantity estimate and the corresponding standard deviation 69 as inputs, and provides an output 79 comprising parameters associated with a noise floor power. This may be a single value of a noise floor power or parameters of an estimated probability distribution of a noise floor power. Prior known parameters representing histograms of probability density functions of noise floor is stored in a storage 71 providing information 72 about a prior expected probability distribution of the noise floor power to the conditional probability distribution estimation block 70, in order to achieve an optimal estimation.

The effect on the subsequent noise power floor estimation processing block is beneficial, but intricate to understand. A highly technical explanation follows for the interested reader.

Note that when the long term average load of the system increases, then normally the neighbour cell interference increases. The consequence is that the likelihood of low values of the estimated total power is reduced with increasing neighbour cell interference. The soft noise power floor estimation algorithm operates by removing portions of the prior probability distribution of the thermal noise power floor, from above, by application of a calculation of the probability distribution of the minimum of the estimated total power. This moves the centre of gravity of the prior distribution towards lower values, thereby reducing the optimal estimate of the thermal noise power floor. The amount that is cut away is determined by the probability distributions of the estimated total power that fall within a pre-determined, sparsely sampled sliding window. Then a total power probability distribution with a larger variance will obviously cut away a larger portion of the prior probability distribution than one with the same mean value and a smaller variance. The reason is that the probability distribution function with the larger variance extends further into the region of nonzero support of the prior probability distribution.

A possible straight-forward approach for estimating the minimum is to compute the estimate over a pre-determined interval of time, a so-called sliding window. The detailed mathematical description of the estimation of the conditional probability distribution based on such a sliding window is given in Appendix B.

In a third, noise rise estimation block 80, the estimated probability distribution of the noise floor 79 and a RTWP estimate and a corresponding standard deviation 68 are received as inputs, and provides primarily an output 81 comprising a noise rise value. In this embodiment, the preferred noise rise measure is defined according to:

$$RoT(t) = \frac{P^{Total}(t)}{P_N}, \quad (4)$$

where $P^{Total}(t)$ is a received total Sideband power, however, also other noise rise measures can be utilized. As mentioned further above, the actual noise rise determination can preferably be performed by determining a probability distribution function of a quotient of a probability distribution function of the RTWP and a probability distribution function of the noise floor.

The blocks 60, 70 and 80 are preferably integrated into one processor. However, any arrangements comprising, but not limited to, different distributed solutions are also possible to use, where the processor means comprising the blocks 60, 70 and 80 may be considered as a distributed processor means.

The estimation of the conditional probability distribution of the thermal noise floor given in Appendix B was based on a sliding window. These algorithms require parameters for management of the sliding window size, since the window size affects the computational complexity. More importantly, the algorithms require storage of two matrix variables, together occupying as much as 0.4-0.8 Mbyte of memory. In particular, one probability distribution function and one cumulative distribution function needs to be computed on a grid, for each power sample that is stored in the sliding window. Typically the grid is discretized in steps of 0.1 dB over the range −120 dBm to −70 dBm, resulting in 1000 variables, for each power sample in the sliding window. With 100 samples power samples in the sliding window, the result is a need to store 400000-800000 bytes depending on if 4 byte or 8 byte variables are used.

An RNC may control about 1000 cells today and more in the future. Therefore, in the RNC 1000 instances may be needed (one per cell). The memory consumption then approaches 1 GB of dynamic memory, a fact that is prohibitive. The conclusion is that the memory consumption of such algorithms for soft noise floor estimation is not acceptable, at least for an RNC implementation. The memory requirements for sliding window approaches would, however, probably be feasible for RBS implementations where only 4 instances need to run in parallel (4 diversity branches).

It should also be noted that the actual computational complexity is no problem since the updates of the noise floor only need to take place a few times per minute, meaning that the noise floor updates for different cells can be scheduled to different intervals of time.

A second problem is also indirectly related to the use of a sliding window for estimation of a minimum. The problem is due to the fact that a power sample with a small value that enters the sliding window remains there during the whole duration of the window. During this period, the small value naturally dominates the minimum estimate. Hence, in case the noise floor would start to increase, this is not reflected until the power sample with a small value finally is shifted out of the sliding window.

In order to solve the above problems, in particular the memory problems, and enable load estimation for admission control purposes in the RNC, the present invention instead uses a recursive algorithm for soft noise floor estimation.

A first main idea in order to find a suitable recursive algorithm is to introduce approximations in the computation of the probability distribution of the minimum power, i.e. the noise floor estimate.

All notation used in this part of the description is explained in detail in the Appendix B. The reason for this approach is that it is a necessary to read the Appendix B to understand the details of the present section. To summarize briefly though, t denotes time, x denotes (discretized) power, f denotes probability density functions and F denotes cumulative distribution functions.

The first step towards a recursive formulation is to remove the transient effect of the sliding window by consideration of the case where $$T_{Lag} \to \infty, \tag{5}$$

i.e. where the width of the sliding window becomes infinite.

Then, the key formula (B12) of Appendix B is transformed into:

$$f_{min\{x^0_{pTotal}(t')\}_{t' \leq t}|Y^t}(x) = \tag{6}$$
$$\sum_{t' \leq t} f_{\Delta x(t'|t)}\left(x - \hat{x}^{Kalman}_{pTotal}(t'|t)\right) \prod_{\substack{q \leq t \\ q \neq t'}} \left(1 - F_{\Delta x(q|t)}\left(x - \hat{x}^{Kalman}_{pTotal}(q|t)\right)\right).$$

For the discussion that follows, the update time t is discretized, i.e. a subscript $_N$ is introduced to give:

$$f_{min}(t_N, x) \equiv f_{min\{x^0_{pTotal}(t')\}_{t' \leq t_N}|Y^{t_N}}(x) = \tag{7}$$
$$\sum_{t' \leq t_N} f_{\Delta x(t'|t_N)}\left(x - \hat{x}^{Kalman}_{pTotal}(t'|t_N)\right)$$
$$\prod_{\substack{q \leq t_N \\ q \neq t'}} \left(1 - F_{\Delta x(q|t_N)}\left(x - \hat{x}^{Kalman}_{pTotal}(q|t_N)\right)\right),$$

where $t_N$ is the discretized time of update.

The first approximation to be introduced is obtained by replacement of the smoothing estimate $\hat{x}_{pTotal}^{Kalman}(t'|t_N)$ by the filter estimate $\hat{x}_{pTotal}^{Kalman}(t'|t')$, according to:

$$\hat{x}_{pTotal}^{Kalman}(t'|t_N) \approx \hat{x}_{pTotal}^{Kalman}(t'|t'). \qquad \text{Assumption 1}$$

This assumption means that the smoothing gain is assumed to be small. In practice the approximation means that a slightly worse performance is accepted, to gain computational simplifications. Approximation 1 simplifies equation (7) to $$f_{min}(t_N, x) \approx \tag{8}$$
$$\sum_{t' \leq t_N} f_{\Delta x(t'|t')}\left(x - \hat{x}^{Kalman}_{pTotal}(t'|t')\right) \prod_{\substack{q \leq t_N \\ q \neq t'}} \left(1 - F_{\Delta x(q|q)}\left(x - \hat{x}^{Kalman}_{pTotal}(q|q)\right)\right).$$

The next step comprises a formulation of a recursive update of a completed product. The completed product, $\Gamma(t_N, x)$ is defined as $$\Gamma(t_N, x) = \prod_{q \leq t_N} \left(1 - F_{\Delta x(q|q)}\left(x - \hat{x}^{Kalman}_{pTotal}(q|q)\right)\right). \tag{9}$$

It then follows that the completed product can be formulated recursively by:

$$\Gamma(t_{N+1}, x) = \prod_{q \leq t_{N+1}} \left(1 - F_{\Delta x(q|q)}\left(x - \hat{x}^{Kalman}_{pTotal}(q|q)\right)\right) = \tag{10}$$
$$\left(1 - F_{\Delta x(t_{N+1}|t_{N+1})}\left(x - \hat{x}^{Kalman}_{pTotal}(t_{N+1}|t_{N+1})\right)\right) =$$
$$\prod_{q \leq t_N} \left(1 - F_{\Delta x(q|q)}\left(x - \hat{x}^{Kalman}_{pTotal}(q|q)\right)\right) =$$
$$\left(1 - F_{\Delta x(t_{N+1}|t_{N+1})}\left(x - \hat{x}^{Kalman}_{pTotal}(t_{N+1}|t_{N+1})\right)\right) \Gamma(t_N, x).$$

This is the first result, where it is noticed that computing a present completed product $\Gamma(t_{N+1}, x)$, i.e. a product of complements of a cumulative error distribution of a first power quantity, can be computed as a product of a previously computed completed product $\Gamma(t_N, x)$, i.e. a previously computed product of complements of the cumulative error distribution of the first power quantity and a first factor $1 - F_{\Delta x(t_{N+1}|t_{N+1})}(x - \hat{x}_{pTotal}^{Kalman}(t_{N+1}|t_{N+1}))$ based on a new complement, of the cumulative probability distribution for the first power quantity.

The next step is to obtain a recursive update of the probability density function of the minimum power itself, i.e. to write $f_{min}(t_N, x)$ recursively. This is obtained as follows, starting with (8).

$$f_{min}(t_{N+1}, x) \approx \sum_{t' \leq t_{N+1}} f_{\Delta x(t'|t')}\left(x - \hat{x}^{Kalman}_{pTotal}(t'|t')\right) \tag{11}$$
$$\prod_{\substack{q \leq t_{N+1} \\ q \neq t'}} \left(1 - F_{\Delta x(q|q)}\left(x - \hat{x}^{Kalman}_{pTotal}(q|q)\right)\right) =$$
$$f_{\Delta x(t_{N+1}|t_{N+1})}\left(x - \hat{x}^{Kalman}_{pTotal}(t_{N+1}|t_{N+1})\right)$$
$$\prod_{\substack{q \leq t_{N+1} \\ q \neq t_{N+1}}} \left(1 - F_{\Delta x(q|q)}\left(x - \hat{x}^{Kalman}_{pTotal}(q|q)\right)\right) +$$
$$\sum_{t' \leq t_N} f_{\Delta x(t'|t')}\left(x - \hat{x}^{Kalman}_{pTotal}(t'|t')\right)$$
$$\prod_{\substack{q \leq t_{N+1} \\ q \neq t_{N+1}}} \left(1 - F_{\Delta x(q|q)}\left(x - \hat{x}^{Kalman}_{pTotal}(q|q)\right)\right) =$$
$$f_{\Delta x(t_{N+1}|t_{N+1})}\left(x - \hat{x}^{Kalman}_{pTotal}(t_{N+1}|t_{N+1})\right)$$
$$\prod_{q \leq t_N} \left(1 - F_{\Delta x(q|q)}\left(x - \hat{x}^{Kalman}_{pTotal}(q|q)\right)\right) +$$
$$\sum_{t' \leq t_N} f_{\Delta x(t'|t')}\left(x - \hat{x}^{Kalman}_{pTotal}(t'|t')\right)$$
$$\left(1 - F_{\Delta x(t_{N+1}|t_{N+1})}\left(x - \hat{x}^{Kalman}_{pTotal}(t_{N+1}|t_{N+1})\right)\right) \times$$
$$\prod_{\substack{q \leq t_N \\ q \neq t'}} \left(1 - F_{\Delta x(q|q)}\left(x - \hat{x}^{Kalman}_{pTotal}(q|q)\right)\right) =$$
$$f_{\Delta x(t_{N+1}|t_{N+1})}\left(x - \hat{x}^{Kalman}_{pTotal}(t_{N+1}|t_{N+1})\right) \Gamma(t_N, x) +$$
$$\left(1 - F_{\Delta x(t_{N+1}|t_{N+1})}\left(x - \hat{x}^{Kalman}_{pTotal}(t_{N+1}|t_{N+1})\right)\right) f_{min}(t_N, x).$$

Here it is seen that the computation of an updated conditional probability distribution of the noise floor measure $f_{min}(t_{N+1}, x)$ can be performed as a summation of two terms. A first term $f_{\Delta x(t_{N+1}|t_{N+1})}(x-\hat{x}_{P^{Total}}^{Kalman}(t_{N+1}|t_{N+1}))\Gamma(t_N,x)$ is a product of the previously computed product $\Gamma(t_N,x)$ of complements of the cumulative error distribution of the first power quantity and a second factor $f_{\Delta x(t_{N+1}|t_{N+1})}(x-\hat{x}_{P^{Total}}^{Kalman}(t_{N+1}|t_{N+1}))$. This second factor is as seen based on a new probability distribution for the first power quantity. The second term $(1-F_{\Delta x(t_{N+1}|t_{N+1})}(x-\hat{x}_{P^{Total}}^{Kalman}(t_{N+1}|t_{N+1})))f_{min}(t_N,x)$ is a product of a previously computed conditional probability distribution $f_{min}(t_N,x)$ of the noise floor measure and the first factor $1-F_{\Delta x(t_{N+1}|t_{N+1})}(x-\hat{x}_{P^{Total}}^{Kalman}(t_{N+1}|t_{N+1}))$, already used in the recursive calculation of the completed product.

As a conclusion, it is seen that a recursive computing of the conditional probability distribution of the noise floor measure is based on a previously computed conditional probability distribution of the noise floor measure, a previously computed product of complements of a previously computed cumulative error distribution of the first power quantity, and a new probability distribution for the first power quantity. The product of complements of the cumulative error distribution of the first power quantity is also recursively computable based on a previously computed product of complements of the cumulative error distribution of the first power quantity and a factor being the complement of a new cumulative probability distribution for the first power quantity. The recursive computation is in other words a coupled recursive computation of two quantities, namely the conditional probability distribution of the noise floor measure itself and the product of complements of the cumulative error distribution of the first power quantity. These are the main entities which have to be stored from one update to the next. Said main entities are discretized over the same power grid as used by the sliding window algorithm (see Appendix B), however, the time dimension of the sliding window is removed. A reduction of the memory requirements by a factor of 100 as compared to soft noise floor algorithm based on sliding window techniques can be achieved. This enables the use of the disclosed algorithm for load estimation in the admission control algorithm even in the RNC.

Figure 6:
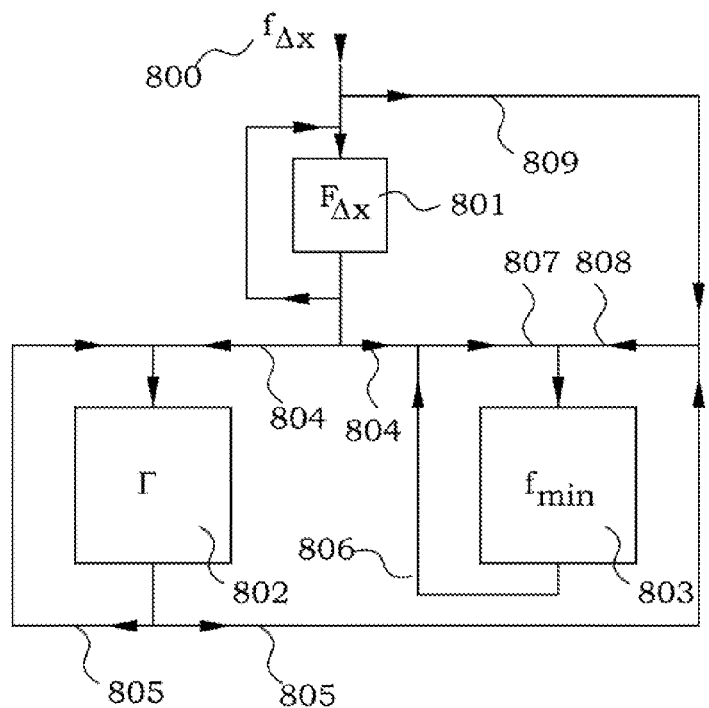
FIG. 6 is an illustration of interdependent recursive algorithms according to the present invention.

The recursive computation can be illustrated graphically in a flow chart as in FIG. 6. 800 denotes a currently computed error distribution for the first power quantity. A cumulative error distribution of the first power quantity is calculated in 801. The first factor 804, based on the cumulative error distribution, is entered into the recursive calculation 802 of a product of complements together with the previously computed product of complements 805. The previously computed product of complements 805 is also combined with a second factor 809 into a first term 808 for the recursive calculation 803 of the conditional probability distribution of the noise floor measure. The second term 807 into this calculation 803 comprises the first factor 804 and a previously calculated conditional probability distribution 806 of the noise floor measure.

Figure 7:
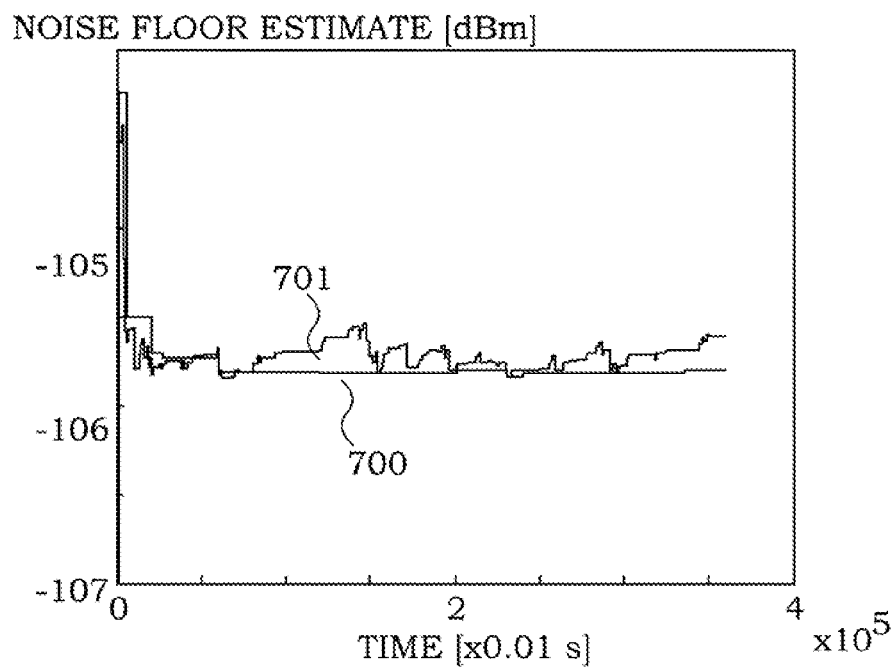
FIG. 7 is a diagram illustrating tracking behaviour of a simulation according to the present invention.

The presently proposed recursive approach involves an approximation. However, as seen in FIG. 7, the influence of this approximation is almost negligible. The figure is a comparison between a sliding window implementation 700, and the recursive algorithm disclosed in the present document 701. The agreement is as seen excellent. The variation is only about 0.05 dB mean square. The varying behavior of the disclosed algorithm is due to a tuning for best tracking performance.

In its basic form, the recursive approach has some disadvantages. The most obvious one is the property of never forgetting any previous information completely. The algorithm will therefore converge to a steady state, and any drifts or changed conditions will have problems to influence the noise floor estimation after a while. It is therefore preferable to include some sort of data forgetting mechanism.

A first simple approach to data forgetting is simply to interrupt the algorithm and let the algorithm start up again from initial values. This will allow for changes in conditions, but will decrease the performance during the first period after start-up. A somewhat more elaborate approach is to let a new recursion start up a while before the old one is stopped. In such a case, the new one may have approached the true noise floor value better before it is actually used. The drawback is that two parallel recursions are active for a while, which complicates the implementation.

Data forgetting may also be introduced by recursive discrete time filtering, techniques, e.g. by means of a standard recursive first order discrete time filter. The bandwidth of the resulting algorithm is directly controlled by the filter constants of the recursive filter. For each fixed power grid point, the recursion (11) is in a form that immediately lends itself to introduction of data forgetting, considering $f_{min}(t_N,x)$ as the state and $\Gamma(t_N,x)$ as the input. Using $0<\beta<1$ as filter constant, results in the recursion:

$$f_{min}(t_{N+1},x)=\beta(1-F_{\Delta x(t_{N+1}|t_{N+1})}(x-\hat{x}_{P^{Total}}^{Kalman}(t_{N+1}|t_{N+1})))f_{min}(t_N,x)+(1-\beta)f_{\Delta x(t_{N+1}|t_{N+1})}(x-\hat{x}_{P^{Total}}^{Kalman}(t_{N+1}|t_{N+1}))\Gamma(t_N,x). \quad (12)$$

The recursion (10) cannot be cast into linear recursive filtering form as it stands. However, by taking logarithms, the following recursion is obtained $$\ln(\Gamma(t_{N+1},x))=\ln(1-F_{\Delta x(t_{N+1}|t_{N+1})}(x-\hat{x}_{P^{Total}}^{Kalman}(t_{N+1}|t_{N+1})))+\ln(\Gamma(t_N,x)). \quad (13)$$

Data forgetting can then be introduced into (13), using the filter constant $\alpha$. The result is:

$$\ln(\Gamma(t_{N+1},x))=(1-\alpha)\ln(1-F_{\Delta x(t_{N+1}|t_{N+1})}(x-\hat{x}_{P^{Total}}^{Kalman}(t_{N+1}|t_{N+1})))+\alpha\ln(\Gamma(t_N,x)) \quad (14)$$

After exponentiation, the following geometric filtering recursion is obtained:

$$\Gamma(t_{N+1},x)=(1-F_{\Delta x(t_{N+1}|t_{N+1})}(x-\hat{x}_{P^{Total}}^{Kalman}(t_{N+1}|t_{N+1})))^{1-\alpha}\Gamma(t_N,x)^\alpha. \quad (15)$$

The recursions (12) and (15) constitute the end result. The output from these coupled recursions is combined with the prior information as in (B13) of Appendix B, and the calculations proceed from there.

Initiation of (12) and (15) is obtained by putting:

$$\Gamma(t_0,x)=1(\Rightarrow \Gamma(t_1,x)=1-F_{\Delta x(t_1|t_1)}(x-\hat{x}_{P^{Total}}^{Kalman}(t_1|t_1))), \quad (16)$$

$$f_{min}(t_0,x)=0(\Rightarrow f_{min}(t_1,x)=f_{\Delta x(t_1|t_1)}(x-\hat{x}_{P^{Total}}^{Kalman}(t_1|t_1))), \quad (17)$$

which is the correct initial behavior.

There are also other ways to introduce data forgetting. One possibility is to use stochastic propagation of the probability density function of (11). This then would require a dynamic model assumption for the diffusion of the probability density function. The approach is fairly complicated and is not treated in detail here.

The introduction of recursive algorithms for soft noise floor estimation has several advantages. One advantage is that the algorithms require only approximately 0.005 Mbyte of memory per cell, i.e. about 1% compared with sliding window approaches. The recursive algorithms reduce the computational complexity further, also as compared to the sliding window algorithms. They avoid the need for control of the computational complexity, with parameter constraints, thereby also reducing the number of parameters for management significantly. They also allow tuning by consideration of standard engineering bandwidth considerations, using alpha and beta tuning parameters.

The tracking properties of the recursive algorithms can be further improved. A specific handling of certain threshold parameters can be introduced to obtain good tracking properties over very wide dynamic ranges.

To explain the first addition, note that during iteration, the values of the probability density function of the minimum power can become very small in grid points well above the wideband power measured in a cell. It can even be 0 to within the resolution of the computer arithmetic. This is acceptable as long as the thermal noise floor does not change. However, in case the thermal noise power floor would suddenly increase, very small values of the probability density function that fall below the measured wideband power after the noise floor change, will require a very long time to grow until they become close to 1. As a consequence, the tracking ability will be poor in case the noise floor would increase. Actual changes can thereby take very long times before being noticed at all.

In order to counteract this unwanted behavior, a minimum permitted value of the probability density function of the minimum power is introduced. Any calculation of a smaller value will be exchanged to the minimum value. Typically, a value around 0.000001 has been found to be suitable.

Figure 8:
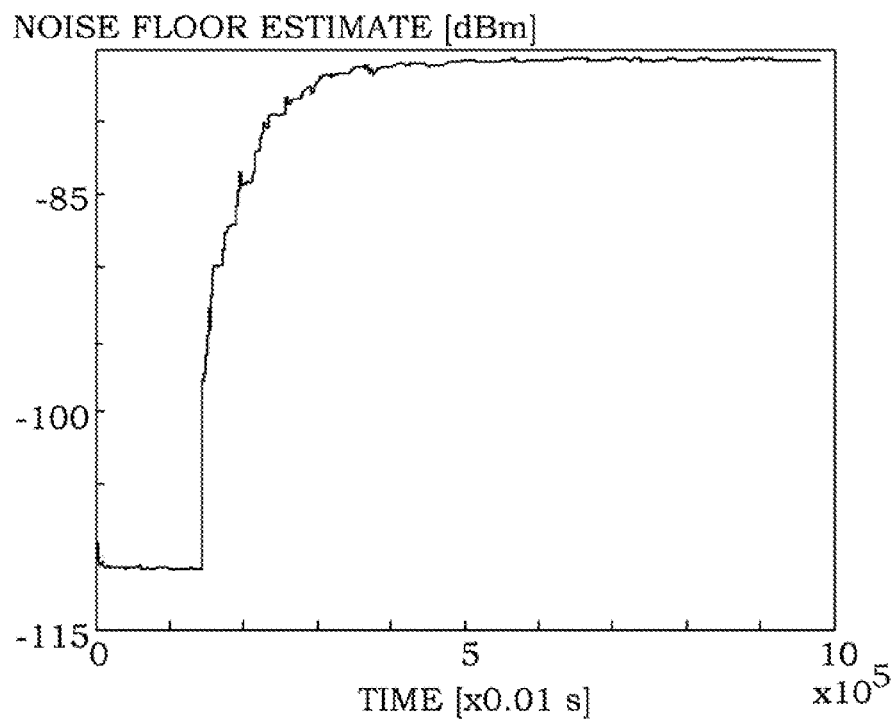
FIG. 8 is a diagram illustrating tracking behaviour at a sudden change of background level.

The tracking performance of the proposed algorithm has been investigated. As can be seen in FIG. 8, the algorithm successfully tracks the thermal noise power floor over 50 dB. The power change is introduced at 1000 s.

Figure 9:
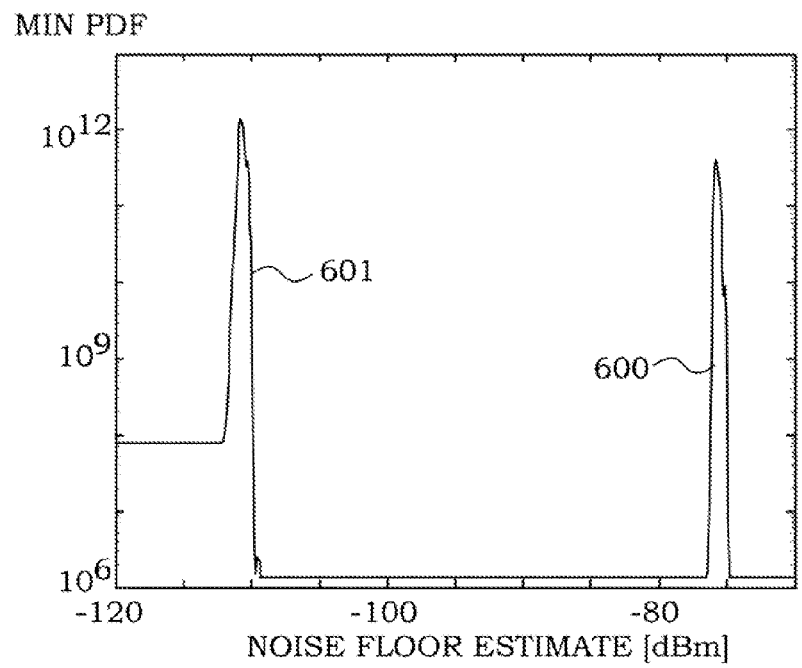
FIG. 9 is a diagram illustrating a probability density function of a minimum of a power quantity derived from total received power measurements.

The probability density function of the noise floor is illustrated in FIG. 9. All values of the probability density function are changed to 0.000001 if a smaller value is obtained in the calculations. The shown case illustrates a situation where the probability density function is increasing around −75 dBm 600 while it is decreasing around −110 dBm, 601. Even though the probability density function is larger around −110 dBm, 601, the probability density function around −75 dBm, 600, dominates the conditional mean of the probability distribution, which equals the optimum estimate. This is because −75 dBm, 600, is a much larger power and since the peak around −110 dBm, 601, is narrower. Note: The peak around −110 dBm, 601, is a remnant from an initial period of time that will eventually disappear.

However, a consequence of the above change is that an unwanted bias is introduced, when the estimate of the thermal noise power floor is estimated. The origin of said bias is the artificially high values of the probability density function of the minimum power that is normally introduced in the majority of the grid points. These high values result in domination by high power grid points in the conditional mean, a fact that manifests itself in a too high estimated noise power floor.

Fortunately this latter problem can be taken care of, simply by removing power grid points that are at the minimum level from all computations of the conditional mean. In other words, for the purpose of estimating the thermal noise power floor, the grid points falling below the minimum value are instead set to identically zero. Note that this should also be applied when a soft noise rise estimate is computed using a quotient distribution.

The algorithmic additions enable tracking over more than 50 dBs of input power. This in turn makes it possible to efficiently handle erroneously configured RBSs that occur frequently in WCDMA networks. Such erroneously configured RBSs may see artificial noise floors between −120 dBm and −70 dBm. Furthermore, one can avoid the need for the safety nets that are required for various sliding window algorithms. These safety nets introduce logic for further control of the estimated thermal noise floor.

It is stressed that there is a strong operational need for efficient load estimation in the admission control function of the RNC. Due to configuration errors in the RBSs and the front end scale factor errors, a substantial amount of manual work is presently needed for admission control algorithm tuning, in fielded systems.

An important advantage is that the algorithm disclosed in the present invention disclosure lends itself to ASIC implementation. This is due to the fact that the algorithm operates as a recursive filter, with no need for dynamic memory allocation. This fact makes the proposed algorithm suitable for a replacement of presently intended sliding window based algorithm of the RBS, in later RBS releases if this should be deemed cost efficient.

Figure 10:
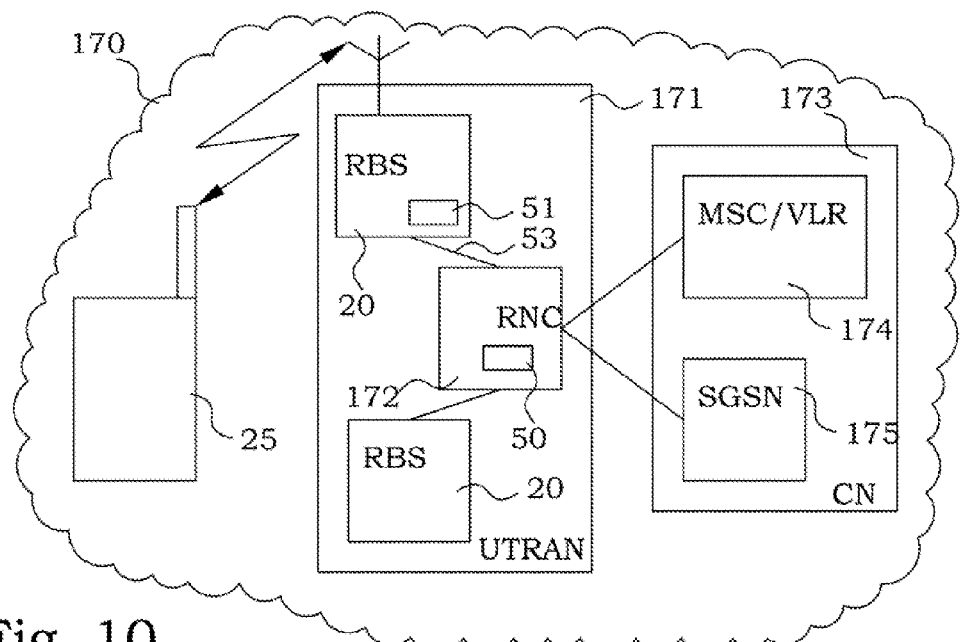
FIG. 10 is a block diagram of main parts of an embodiment of a system according to the present invention.

In the description above, it is assumed that the power estimations concern uplink communication. The power measurements are in such cases performed by a node in the radio access network, typically the radio base station or the radio network controller. FIG. 10 illustrates main parts of an embodiment of a system according to the present invention, where load estimation is performed in the RNC. A wireless communications system 170 comprises a Universal mobile telecommunication system Terrestrial Radio Access Network (UTRAN) 171. A mobile terminal 25 is in radio contact with a RBS 20 in the UTRAN 171. The RBS 20 is controlled by a Radio Network Controller (RNC) 172, which in turn is connected to a Mobile services Switching Centre/Visitor Location Register (MSC/VLR) 174 and a Serving General packet radio system Support Node (SGSN) 175 of a core network CN 173.

In this embodiment, the RBS 20 comprises a power sensing arrangement 51, typically an antenna and front end electronics, for measuring instantaneous received total wideband power. A connection 53, the so-called Iub interface, is used for communication between the RBS 20 and the RNC 172. According to standards, the Iub interface allows for transferring measured samples of received total wideband power. The connection 53 is thus a means for the RNC 172 to obtain data representing measured samples of received total wideband power. A noise rise estimation arrangement 50 is available in the RNC 172, arranged for receiving measured samples of received total wideband power over the connection 53.

Figure 11:
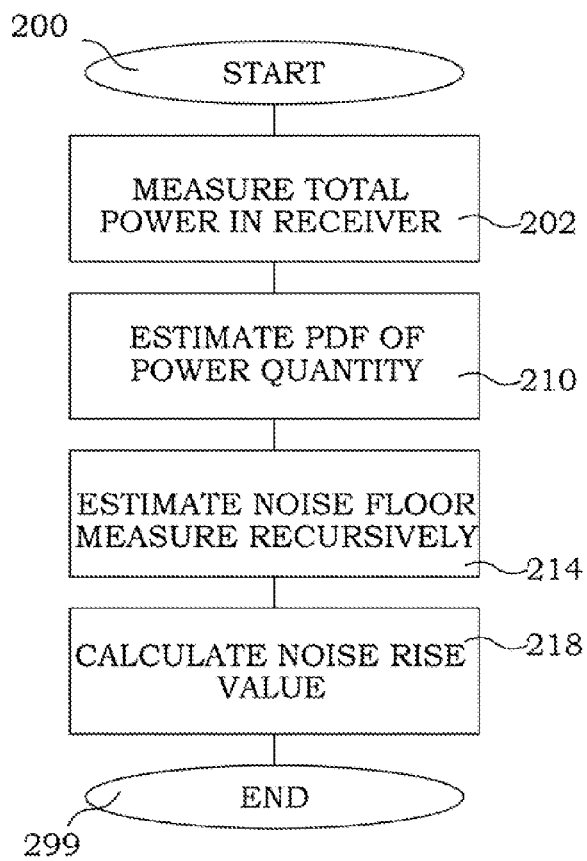
FIG. 11 is flow diagram of main steps of an embodiment of a method according to the present invention.

FIG. 11 illustrates a flow diagram of main steps of an embodiment of a method according to the present invention. The procedure starts in step 200. In step 202, a number of samples of at least the received total wideband power are measured. In step 210, a probability distribution for a first power quantity is estimated from at least the measured samples of the received total wideband power. The first power quantity can be the received total wideband power. In step 214, a conditional probability distribution of a noise floor measure is computed based on at least the probability distribution for the first power quantity. This step is performed recursively. Finally, in step 218, a value of a noise rise measure is calculated based at least on the conditional probability distribution for the noise floor measure. The procedure ends in step 299.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

APPENDIX A

Kalman Filter for RTWP Measurements

A proposed algorithm for the case where the total RTWP is measured is a prediction-update filter, where the subscripts distinguish between the prediction and the update steps.

$$K_{Update}(t) = \frac{P_{Prediction}^{Cov}(t - T_{min})}{P_{Prediction}^{Cov}(t - T_{min}) + r_{Measurement}} \quad (A1)$$

$$P_{Update}^{Total}(t) = P_{Prediction}^{Total}(t - T_{min}) + K_{Update}(t) \times \begin{pmatrix} P_{Measurement}^{Total}(t) - \\ P_{Prediction}^{Total}(t) \end{pmatrix} \quad (A2)$$

$$P_{Update}^{Cov}(t) = P_{Prediction}^{Cov}(t - T_{min}) - \frac{P_{Prediction}^{Cov2}(t - T_{min})}{P_{Prediction}^{Cov}(t - T_{min}) + r_{Measurement}} \quad (A3)$$

$$P_{Prediction}^{Total}(t) = P_{Update}^{Total}(t) \quad (A4)$$

$$P_{Prediction}^{Cov}(t) = P_{Update}^{Cov}(t) + \frac{T_{min}}{T_{Correlation}} r \quad (A5)$$

(A1)-(A5) are repeated increasing t by steps of $T_{min}$. Initialization is made at t=0 by:

$$P_{Prediction}^{Total}(0) = P_0^{Total} \quad (A6)$$

$$P_{Prediction}^{Cov}(0) = P_0. \quad (A7)$$

As seen above, the updating gain $K_{Update}(t)$ is computed from the model parameter $r_{Measurement}$ and from a predicted covariance $P_{Prediction}^{Cov}(t-T_{min})$ obtained at the previous sampling instance. The total wideband power updated with the latest measurement $P_{Update}^{Total}(t)$ is then computed, using the prediction $P_{Prediction}^{Total}(t)$ and the new measurement $P_{Measurement}^{Total}(t)$. The next step is to compute the updated covariance $P_{Update}^{Cov}(t)$ from the predicted covariance and from $r_{Measurement}$. In the final steps of iteration new values of $P_{Prediction}^{Total}(t)$ and $P_{Prediction}^{Cov}(t)$ are calculated and the time is stepped. $T_{min}$ denotes the sampling period.

APPENDIX B

Estimation of the conditional probability distribution of $$\min_{t' \in [t-T_{Lag}, t]} P^{Total}(t')$$

Note: It is very natural to estimate minimum powers. However, the choice to use the minimum value is really ad-hoc. In a general case, an extreme value of a quantity in some way dependent on the estimated $P^{Total}$ quantity would be possible to use as a base for the further computations. However, as a simplest embodiment the quantity $$\min_{t' \in [t-T_{Lag}, t]} P^{Total}(t')$$

is considered here. Note that $P^{Total}$ in the coming discussion refers to the received total wideband power.

Notation, Conditional Probability and Baye's Rule

In the following Bayes rule and the definition of conditional mean, for probability distributions, are used extensively. The following definitions and results can be found e.g. in T. Söderström, Discrete Time Stochastic Systems. London, UK: Springer, 2002, pages 12-14, or any other text book on estimation.

Probability distributions: Consider two events A and B, with probability distributions $f_A(x)$ and $f_B(y)$, respectively. Then the joint probability distribution of A and B is denoted $f_{A,B}(x,y)$.

Note that the events and the conditioning are expressed by subscripts, whereas the independent variables appear within the parentheses. This notation is used only when probability distributions and cumulative probability distributions are used. When state estimates and covariances, e.g. of the Kalman filter, are referred to, the conditioning may also appear within parentheses.

Conditional probability distributions: The conditional probability distributions $f_{A|B}(x)$ and $f_{B|A}(y)$ are defined by:

$$f_{A,B}(x,y) = f_{A|B}(x)f_B(y) = f_{B|A}(y)f_A(x). \quad (B1)$$

Note that as a consequence of the notation for probability distributions, also the conditioning is expressed as subscripts.

A solution of the above equation now results in the famous Bayes rule:

$$f_{A|B}(x) = \frac{f_{B|A}(y) f_A(x)}{f_B(y)}. \quad (B2)$$

Note that the rules above are best understood by using intersecting circle diagrams. The formal proofs to obtain the results for probability distributions can e.g. use infinitesimal limiting versions of motivations for the probability cases.

Conditional Probability of the Minimum—Model and General Expressions

In this section some general properties of a minimum estimator are derived. Towards that end, the following notation is introduced. The Kalman filter or Kalman smoother estimate of $P^{Total}(t')$ is denoted by:

$$\hat{x}_{P^{Total}}^{Kalman}(t' \mid Y^t) \equiv \hat{x}_{P^{Total}}^{Kalman}(t' \mid \{y(s)\}_{N \in [-\infty, t]}) = \hat{x}_{P^{Total}}^{Kalman}(t' \mid \{y(s)\}_{S \in [t-T_{Lag}, t]}, \hat{x}_{P^{Total}}^{Kalman}(t - T_{Lag} \mid Y^{t-T_{Lag}})). \quad (B3)$$

Here t' denotes some time within $[t-T_{Lag}, t]$. The conditional distributions are, under mild conditions, all Gaussian sufficient statistics, i.e. only second order properties are needed in order to describe the conditional probability distributions. This is reflected in the conditioning in the last expression of (A3). The conditional distributions follow as:

$$f_{\hat{x}_{P^{Total}}^{Kalman}(t' \mid Y^t)}(x) \in N(\hat{x}_{P^{Total}}^{Kalman}(t' \mid t), (\sigma_{P^{Total}}^{Kalman}(t' \mid t))^2), \quad (B4)$$

where Kalman indicates that the estimate is computed with the Kalman filter or, if t'<t, the Kalman smoother. The quantities $\hat{x}_{P^{Total}}^{Kalman}(t'|t)$ and $(\sigma_{P^{Total}}^{Kalman}(t'|t))^2$ denote the power estimate and the corresponding covariance, respectively, i.e. the inputs to the estimator. Note that (B4) assumes that the corresponding estimate at time $t-T_{Lag}$ is used as initial value for the Kalman filter.

Then the conditional distribution for the minimum value of the power estimate can be further developed. Towards that end the following model is assumed for the relation between $x_{pTotal}^0(t') = P^{0,Total}(t')$ that represents the true power and $\hat{x}_{pTotal}^{Kalman}(t'|t) = \hat{P}^{Total}(t'|t)$ that represents the estimate:

$$x_{pTotal}^0(t') = \hat{x}_{pTotal}^{Kalman}(t'|t) + \Delta x_{pTotal}(t'|t) \tag{B5}$$

$$x_{pTotal}^0(t') \in N(\hat{x}_{pTotal}^{Kalman}(t'|t), (\sigma_{pTotal}^{Kalman})(t'|t))^2). \tag{B6}$$

This is in line with the above discussion on sufficient statistics. The notation for the distribution of $\Delta x_{pTotal}(t'|t)$ is henceforward simplified to:

$$f_{\Delta x}(x). \tag{B7}$$

Note that this distribution does not have to be assumed to be Gaussian (although this is mostly the assumption made).

The conditional probability distribution of the minimum value of $x_{pTotal}^0(t') = P^{0,Total}(t')$, $t' \in \lfloor t-T_{Lag}, t \rfloor$ is then to be estimated using data $y(t)$, obtained from the time interval $[-\infty, t]$.

FIG. 4 illustrates a diagram showing time variations 102 of a total received wideband power $P^{Total}(t)$. During some time intervals, the total received wideband power presents high values. However, at some occasions, the total received wideband power becomes small, indicating that many of the usual contributions to the measured power are absent.

As will be seen below, smoother estimates are theoretically required as inputs to the conditional probability estimation algorithm for the minimum power that operates over the time interval $\lfloor t-T_{Lag}, t \rfloor$. To formally retain optimality in the development, the smoother estimates should also be calculated using all data in $\lfloor t-T_{Lag}, t \rfloor$. However, in a practical implementation, these smoother estimates are typically computed using only a short snapshot of data around the selected smoothing time instance. Several such smoothing estimates, from $\lfloor t-T_{Lag}, t \rfloor$, are then combined to estimate the conditional probability distribution. In the coming discussion the interval $\lfloor t-T_{Lag}, t \rfloor$ is retained in all quantities though, so as not to complicate the development too much. A further simplification can be obtained by replacement of the smoother estimate with a Kalman filter estimate. Simulations indicate that this can be done with very little loss of performance.

The conditional distribution of the minimum value can now be written as follows (cf. (B5)):

$$f_{min\{x_{pTotal}^0(t')\}_{t' \in [t-T_{Lag}, t]} | Y^t, \min x_{pTotal}^0(t-T_{Lag})}(x), \tag{B8}$$

where the last quantity of (B8) denotes the initial information of the minimum value. In the following Bayes rule and the definition of conditional mean, for probability distributions, are used extensively.

Then apply Bayes rule and the definition of conditional probability to (B8) using the definitions:

$$A := \min\{x_{pTotal}^0(t')\}_{t' \in [t-T_{Lag}, t]}$$

$$B := \min x_{pTotal}^0(t-T_{Lag})$$

$$C := Y^t$$

The following chain of equalities then holds, using Bayes rule, the definition of conditional probability distributions, and the result $f_{B,C|A}(x,y) = f_{(B|A),(C|A)}(x,y)$ (the latter result is easily checked by the drawing of a three-circle diagram):

$$f_{A|B}(x) = \frac{f_{B,C|A}(x,y)f_A(x)}{f_{B,C}(x,y)} = \tag{B9}$$

$$\frac{f_{(B|A),(C|A)}(x,y)f_A(x)}{f_{B,C}(x,y)} = \frac{f_{(B|A)}(x)f_{(C|A)}(y)f_A(x)}{f_{B,C}(x,y)} =$$

-continued
$$\frac{f_{B|A,C}(x)f_{C|A}(y)f_A(x)}{f_{B,C}(x,y)} = \frac{f_{B|A,C}(x)f_{A|C}(x)f_C(y)}{f_{B,C}(x,y)}.$$

The last step can again be easily verified by drawing circle diagrams. Now, according to the definitions above, the first factor of the numerator of (B9) is a prior and hence the conditioning disappears. The second factor of the numerator will be further expanded below, whereas the last factor of the numerator and the denominator can be treated as parts of a normalizing constant. Back-substitution of the definitions of A, B and C then proves the relation:

$$f_{min\{x_{pTotal}^0(t')\}_{t' \in [t-T_{Lag}, t]} | Y^t, \min x_{pTotal}^0(t-T_{Lag})}(x) = \tag{B10}$$

$$\frac{1}{c} f_{min\{x_{pTotal}^0(t')\}_{t' \in [t-T_{Lag}, t]} | Y^t}(x) f_{\min x_{pTotal}^0(t-T_{Lag})}(x).$$

One consequence of (B10) that needs to be kept in mind is that a smoothing problem is at hand. The Kalman filtering based pre-processing step treated above hence formally needs to include a Kalman smoother step. In practice, the Kalman filter is normally sufficient though.

Final Expansion of the Conditional Mean of the Minimum Power

The starting point of this subsection is equation (B10) that states that the conditional pdf (probability distribution function) is given as the product of a prior (initial value) and a measurement dependant factor. The prior is supplied by the user and should reflect the prior uncertainty regarding PN. Note that whenever the sliding window is moved and a new estimate is calculated, the same prior is again applied. The prior is hence not updated in the basic setting of the estimator.

To state the complete conditional pdf some further treatment of the first factor of (B10) is needed. The error distribution $f_{\Delta P}(x)$ of (B7), together with the definitions (B5) and (B6) will be central towards this end. Further, in the calculations below, F( ) denotes a cumulative distribution, i.e. the integral of f. Pr(.) denotes the probability of an event.

The following equalities now hold for the first factor of (B10):

$$F_{min\{x_{pTotal}^0(t')\}_{t' \in [t-T_{Lag}, t]} | Y^t}(x) = \tag{B11}$$

$$Pr\left(\min\{x_{pTotal}^0(t')\}_{t' \in [t-T_{Lag}, t]} \le x \middle| Y^t\right) =$$

$$1 - Pr\left(\min\{x_{pTotal}^0(t')\}_{t' \in [t-T_{Lag}, t]} > x \middle| Y^t\right) =$$

$$1 - Pr\left(\forall t', \Delta x_{pTotal}(t'|t) > x - \hat{x}_{pTotal}^{Kalman}(t'|t)\right) =$$

$$1 - \prod_{t' \in [t-T_{Lag}, t]} Pr\left(\Delta x_{pTotal}(t'|t) > x - \hat{x}_{pTotal}^{Kalman}(t'|t)\right) = 1 -$$

$$\prod_{t' \in [t-T_{Lag}, t]} \left(1 - Pr\left(\Delta x_{pTotal}(t'|t) \le x - \hat{x}_{pTotal}^{Kalman}(t'|t)\right)\right) =$$

$$1 - \prod_{t' \in [t-T_{Lag}, t]} \left(1 - F_{\Delta x(t'|t)}\left(x - \hat{x}_{pTotal}^{Kalman}(t'|t)\right)\right).$$

The fourth equality of (B11) follows from the assumption that the Kalman smoother provides a sufficient statistics, i.e.

(B5) and (B6). The last equality follows from (B7). Obviously, the most natural assumption is to use a Gaussian distribution for $F_{\Delta P(s)}$. However, (B11) actually allows other distributions as well.

The final step in the derivation of the first factor of the distribution function is to differentiate (B11), obtaining:

$$f_{\min\{x_{pTotal}^0(t')\}_{t'\in[t-T_{Lag},t]}}^{Y^t}(x) = \frac{dF_{\min\{x_{pTotal}^0(t')\}_{t'\in[t-T_{Lag},t]}}^{Y^t}(x)}{dx} = \sum_{t'\in[t-T_{Lag},t]} f_{\Delta x(t'|t)}(x - \hat{x}_{pTotal}^{Kalman}(t'|t)) \prod_{\substack{q\in[t-T_{Lag},t] \\ q\neq t'}} (1 - F_{\Delta x(t'|t)}(x - \hat{x}_{pTotal}^0(t'|q))) \quad (B12)$$

Combining with (B10), gives the end result:

$$f_{\min\{x_{pTotal}^0(t')\}_{t'\in[t-T_{Lag},t]}}\bigg|_{Y^t, \min x_{pTotal}^0(t-T_{Lag})}(x) = \frac{1}{c}\left(\sum_{t'\in[t-T_{Lag},t]} f_{\Delta x(t'|t)}(x - \hat{x}_{pTotal}^{Kalman}(t'|t)) \prod_{\substack{q\in[t-T_{Lag},t] \\ q\neq t'}} (1 - F_{\Delta x(t'|t)}(x - \hat{x}_{pTotal}^{Kalman}(t'|q)))\right) f_{\min x_{pTotal}^0(t-T_{Lag})}(x) \quad (B13)$$

This result constitutes the output 79 referred to in connection with FIG. 5. The expression may look complex. It is fortunately straightforward to evaluate since it is a one dimensional function of Gaussian and cumulative Gaussian distributions given by:

$$f_{\Delta x(t'|t)}(x - \hat{x}_{pTotal}^{Kalman}(t'|t)) = \frac{1}{\sqrt{2\pi}\,\sigma_{pTotal}^{Kalman}(t'|t)} e^{-\frac{(x-\hat{x}_{pTotal}^{Kalman}(t'|t))^2}{2(\sigma_{pTotal}^{Kalman}(t'|t))^2}} \quad (B14)$$

$$F_{\Delta x(t'|t)}(x - \hat{x}_{pTotal}^{Kalman}(t'|t)) = \int_{-\infty}^{x-\hat{x}_{pTotal}^{Kalman}(t'|t)} f_{\Delta r(t'|t)}(y)dy = \frac{1}{2}\mathrm{erfc}\left(-\frac{(x-\hat{x}_{pTotal}^{Kalman}(t'|t))}{\sqrt{2}\,\sigma_{pTotal}^{Kalman}(t'|t)}\right). \quad (B15)$$

The quantities $\hat{x}_{pTotal}^{Kalman}(t'|t)$ and $\sigma_{pTotal}^{Kalman}(t'|t)$ are readily available as outputs from the Kalman smoother, or the simpler Kalman filter.

If a noise floor value is to be provided as an output, a mean value computation is performed on the output distribution.

The invention claimed is:

1. Method for noise rise estimation in a wireless communications system, comprising the steps of:
measuring samples of at least received total wideband power;
estimating a probability distribution for a first power quantity from at least said measured samples of at least received total wideband power;
computing a conditional probability distribution of a noise floor measure based on at least said probability distribution for said first power quantity;
said step of computing being performed recursively; and
calculating a value of a noise rise measure based on said conditional probability distribution for said noise floor measure.

2. The method according to claim 1, wherein said recursive computing of said conditional probability distribution of said noise floor measure is based on a previously computed conditional probability distribution of said noise floor measure, a previously computed product of complements of a previously computed cumulative error distribution of said first power quantity and a new probability distribution for said first power quantity.

3. The method according to claim 2, wherein said recursive computing of said conditional probability distribution of said noise floor measure is based on a recursive computing of said computed product of complements of a previously computed cumulative error distribution of said first power quantity.

4. The method according to claim 3, wherein said step of recursively computing said conditional probability distribution of said noise floor measure in turn comprises the steps of;
computing a present product of complements of said cumulative error distribution of said first power quantity as a product of a previously computed product of complements of said cumulative error distribution of said first power quantity and a first factor based on a new complement of said cumulative probability distribution for said first power quantity; and
computing said conditional probability distribution of said noise floor measure as a sum of a first term and a second term, said first term being a product of said previously computed product of complement of said cumulative error distribution of said first power quantity and a second factor based on a new probability distribution for said first power quantity, said second term being a product of said previously computed conditional probability distribution of said noise floor measure and a said first factor.

5. The method according to claim 4, wherein said step of recursively computing said conditional probability distribution of said noise floor measure is performed according to;

$$f_{\min}(t_{N+1},x) = f_{\Delta x(t_{N+1}|t_{N+1})}(x - \hat{x}_{pTotal}^{Kalman}(t_{N+1}|t_{N+1}))\Gamma(t_N,x) + (1 - F_{\Delta x(t_{N+1}|t_{N+1})}(x - \hat{x}_{pTotal}^{Kalman}(t_{N+1}|t_{N+1})))f_{\min}(t_N,x),$$

$$\Gamma(t_{N+1},x) = (1 - F_{\Delta x(t_{N+1}|t_{N+1})}(x - \hat{x}_{pTotal}^{Kalman}(T_{n+1}|T_{N+1})))\Gamma(t_N,x)$$

where $t_N$ is a measuring time of sample N of at least the received total wideband power, x denotes discretized power, $f_{min}(t_N,x)$ is a probability density function of a minimum of said first power quantity at time $t_N$, $\Gamma(t_N,x)$ is said product of complements of said cumulative error distribution of said first power quantity, $f_{\Delta x(t_{M+1}|t_{N+1})}(x - \hat{x}_{pTotal}^{Kalman}(t_{N+1}|t_{N+1}))$ is an error distribution of said first power quantity at time $t_{N+1}$ and $F_{\Delta x(t_{N+1}|t_{N+1})}(x - \hat{x}_{pTotal}^{Kalman}(t_{N+1}|t_{N+1}))$ is a cumulative error distribution of said first power quantity at time $t_{x+1}$.

6. The method according to claim 1, comprising the further step of introducing a data forgetting mechanism.

7. The method according to claim 6, wherein said step of introducing a data forgetting mechanism comprises intermittent restarting of said noise rise estimation.

8. The method according to claim 6, wherein said step of introducing a data forgetting mechanism comprises stochastic propagation of said conditional probability density function of the noise floor measure.

9. The method according to claim 4, wherein said data forgetting mechanism is implemented with filter constants in the recursive computing steps.

10. The method according to claim 5, wherein said data forgetting mechanism is implemented as:

$$\Gamma(t_{n+1},x)=(1-F_{\Delta x(t_{N+1}|T_{N+1})}(x-\hat{x}_{p^{Total}}^{Kalman}(t_{N+1}|t_{N+1})))^{1-\alpha}\Gamma(t_N,x)^{\alpha},$$

$$f_{min}(t_{N+1},x)=\beta(1-F_{\Delta x(t_{N+1}|t_{N+1})}(x-\hat{x}_{p^{Total}}^{Kalman}(t_{N+1}|t_{N+1})))f_{min}(t_N,x)+(1-\beta)f_{\Delta x(t_{N+1}|N+1)}(x-\hat{x}_{p^{Total}}^{Kalman}(t_{N+1}|t_{N+1}))\Gamma(t_N,x),$$

where $\alpha$ and $\beta$ are filter constants.

11. The method according to claim 1, comprising the further step of introducing a minimum value of said conditional probability distribution of said noise floor measure.

12. The method according to claim 11, wherein said minimum value is in the order of magnitude of 0.0000011.

13. The method according to claim 11 wherein power grid points of said conditional probability distribution of said noise floor measure having said minimum value are removed from said step of calculating a value of a noise rise measure based on said conditional probability distribution for said noise floor measure.

14. The method according to claim 1, wherein said step of calculating a value of a noise rise measure is based on an estimate of a noise floor, in turn based on said conditional probability distribution of said noise floor measure.

15. The method according to claim 1, wherein said step of calculating a value of a noise rise measure is based on a conditional probability distribution of said noise rise measure, in turn based on said conditional probability distribution of said noise floor measure.

16. The method according to claim 1, wherein said first power quantity is received total wideband power.

17. Node of a wireless communications system, comprising:
 means for obtaining measured samples of at least received total wideband power;
 means for estimating a probability distribution for a first power quantity from at least said measured received samples of at least total wideband power, connected to said means for obtaining measured samples of at least received total wideband power;
 means for computing a conditional probability distribution of a noise floor measure based on at least said probability distribution for said first power quantity, connected to said means for estimating a probability distribution for a first power quantity;
 said means for computing a conditional probability distribution of a noise floor measure being arranged for performing said computing recursively; and
 means for calculating a value of said noise rise measure based on said conditional probability distribution for said noise floor measure, connected to said means for computing a conditional probability distribution of a noise floor measure.

18. The node according to claim 17, wherein said means for obtaining measured samples of received total wideband power comprises means for receiving data representing measured samples of at least received total wideband power over a communication interface.

19. The node according to claim 17, wherein said node is a radio network controller.

20. The node according to claim 17, wherein said node is a node of a WCDMA system.

* * * * *

UNITED STATES PATENT AND TRADEMARK OFFICE
CERTIFICATE OF CORRECTION

PATENT NO. : 8,346,177 B2
APPLICATION NO. : 12/442901
DATED : January 1, 2013
INVENTOR(S) : Wigren It is certified that error appears in the above-identified patent and that said Letters Patent is hereby corrected as shown below:

In the Specifications

In Column 1, Line 43, delete "cell" and insert -- cell, --, therefor.

In Column 6, Line 31, delete "$P_i^{Code}(t)$." and insert -- $P_t^{Code}(t)$. --, therefor.

In Column 10, Line 6, delete "Sideband" and insert -- wideband --, therefor.

In Column 11, Line 25, delete "subscript$_N$" and insert -- subscript $_N$ --, therefor.

In Column 12, Line 7, in Equation (10), delete "$(x - \hat{x}_{pTotal}^{Kalman}(t_{N+1} | t_{N+1}))) = \prod_{q \leq !N} (1 - F_{\Delta s(q|q)}(x - \hat{x}_{pTotal}^{Kalman}(q | q))) =$" and insert -- $(x - \hat{x}_{pTotal}^{Kalman}(t_{N+1} | t_{N+1}))) \prod (1 - F_{\Delta s(q|q)}(x - \hat{x}_{pTotal}^{Kalman}(q | q)))$ --, therefor.

In Column 13, Line 6, delete "$(t_{N+1} | t_{N+1}))$," and insert -- $(t_{N+1} | t_{N+1})))$, --, therefor.

In Column 18, Line 20, delete "$f_{AB}(x)$" and insert -- $f_{A|B}(x)$ --, therefor.

In Column 18, Line 58, delete "Kalman" and insert -- $^{Kalman}$ --, therefor.

In Column 19, Line 1, delete "$X_{pTotal}^O(t')=P^{O,Total}(t')$," and insert -- $X_{pTotal}^O(t')=P^{O,Total}(t')$ --, therefor.

Signed and Sealed this
Fifteenth Day of April, 2014

Michelle K. Lee
*Deputy Director of the United States Patent and Trademark Office*

In Column 19, Line 53, delete "$B:=\min x_{p^{Total}(t-t_{Lag})}^{0}$" and insert -- $B:=\min x_{p^{Total}(t-T_{Lag})}^{0}$ --, therefor.

In Column 19, Line 64, in Equation (B9), delete "$F_{A|B}(x)$" and insert -- $f_{A|B,C}(x)$ --, therefor.

In the Claims

In Column 22, Line 24, in Claim 4, delete "steps of;" and insert -- steps of: --, therefor.

In Column 22, Line 42, in Claim 5, delete "to;" and insert -- to: --, therefor.

In Column 22, Line 53, in Claim 5, delete "$t_{N,\Gamma(tN},x)$" and insert -- $t_N,\Gamma(t_N,x)$ --, therefor.

In Column 22, Line 55, in Claim 5, delete "$f_{\Delta x(t_{M+1}|t_{N+1})}(x-\hat{x}_{p^{Total}}^{Kalman}(t_{N+1}|t_{N+1}))$" and insert -- $f_{\Delta x(t_{N+1}|t_{N+1})}(x-\hat{x}_{p^{Total}}^{Kalman}(t_{N+1}|t_{N+1}))$ --, therefor.

In Column 22, Line 58, in Claim 5, delete "$t_{x+1}$." and insert -- $t_{N+1}$. --, therefor.

In Column 23, Line 6, in Claim 10, delete "$\Gamma(t_{n+1},x)=$" and insert -- $\Gamma(t_{N+1},x)=$ --, therefor.

In Column 23, Line 18, in Claim 12, delete "0.0000011." and insert -- 0.000001. --, therefor.

In Column 23, Line 18, in Claim 13, delete "claim 11" and insert -- claim 11, --, therefor.